United States Patent [19]

Komurasaki

[11] Patent Number: 4,788,957

[45] Date of Patent: Dec. 6, 1988

[54] IGNITION TIMING CONTROL DEVICE FOR INTERNAL-COMBUSTION ENGINES

[75] Inventor: Satosi Komurasaki, Hyogo, Japan

[73] Assignee: Mitsubishi Denki Kabushiki Kaisha, Tokyo, Japan

[21] Appl. No.: 135,366

[22] Filed: Dec. 21, 1987

[30] Foreign Application Priority Data

Dec. 22, 1986 [JP] Japan .................. 61-307387
Jan. 20, 1987 [JP] Japan .................. 62-10779

[51] Int. Cl.$^4$ .................................................. F02P 5/04
[52] U.S. Cl. ...................................... 123/425; 73/35
[58] Field of Search ............... 123/425, 435, 416, 422, 123/492; 73/35; 364/431.08

[56] References Cited

U.S. PATENT DOCUMENTS

| | | | |
|---|---|---|---|
| 4,606,316 | 8/1986 | Komurasaki | 123/425 |
| 4,607,602 | 8/1986 | Komurasaki | 123/425 |
| 4,675,821 | 6/1987 | Aoki et al. | 123/425 |
| 4,676,212 | 6/1987 | Kashimura et al. | 123/425 |
| 4,699,105 | 10/1987 | Jensen | 123/425 |
| 4,699,106 | 10/1987 | Haraguchi et al. | 123/425 |
| 4,700,677 | 10/1987 | Bonitz et al. | 123/425 |
| 4,708,113 | 11/1987 | Harada et al. | 123/425 |
| 4,710,881 | 12/1987 | Mouri et al. | 123/425 |
| 4,711,213 | 12/1987 | Sakakibara et al. | 123/425 |

*Primary Examiner*—Raymond A. Nelli
*Attorney, Agent, or Firm*—Bernard, Rothwell & Brown

[57] ABSTRACT

An ignition timing control device for internal-combustion engines which is provided in an internal-combustion engine to control the ignition timing of the internal-combustion engine, such as a gasoline engine and a diesel engine mounted as an automotive engine, and to control what is called a knocking phenomenon including abnormal sound and abnormal vibration resulting from abnormal combustion in the combustion chamber, and includes a knocking sensor which senses knocking information of the internal-combustion engine, a knocking discriminator which discriminates the knocking phenomenon in each cylinder of the engine sensed by the knocking sensor, a processing device which performs specific processing in accordance with the knocking phenomenon thus discriminated, a phase shifter which performs the phase shift control of an ignition signal by the output of this processing device, and a switching circuit which turns on and off the ignition coil by the output of this phase shifter; the processing device including an integrator which calculates the integral voltage by the discriminator output and resets this integral voltage correspondingly to ignition operation, and an integrator which integrates the integral voltage thus reset, and furthermore the processing device is provided, when required, with a subtractor which subtracts a specific value corresponding to for example an engine noise signal from the output of the discriminator.

6 Claims, 10 Drawing Sheets

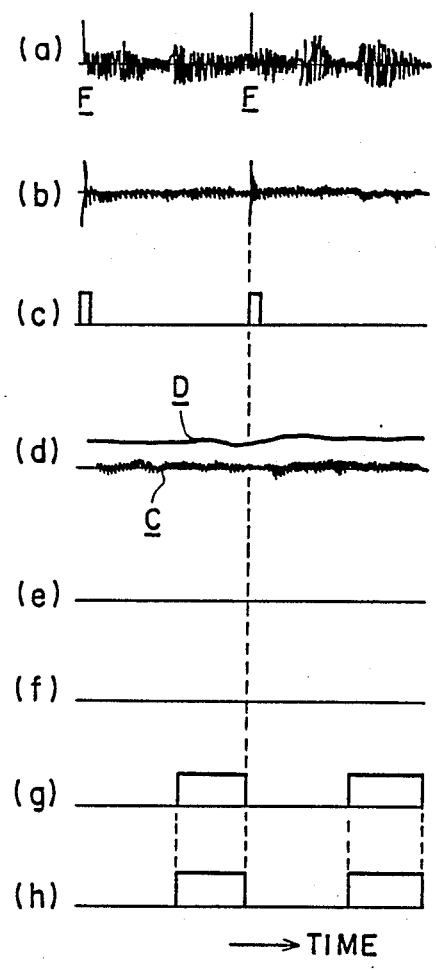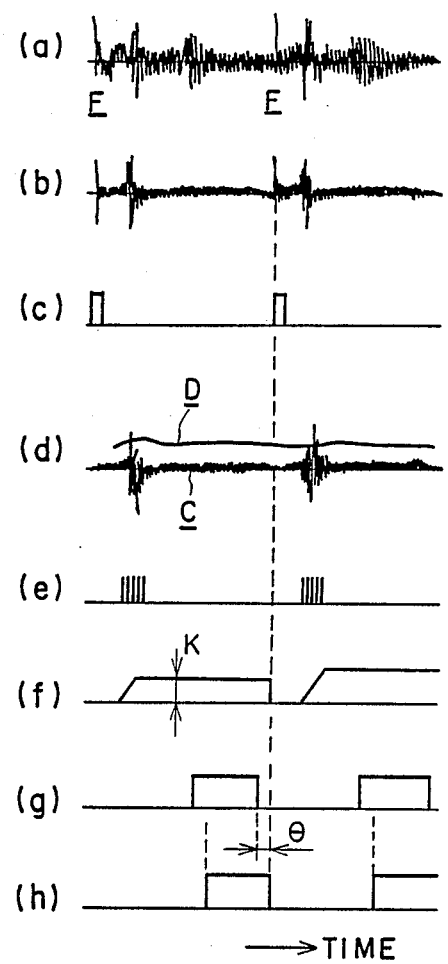

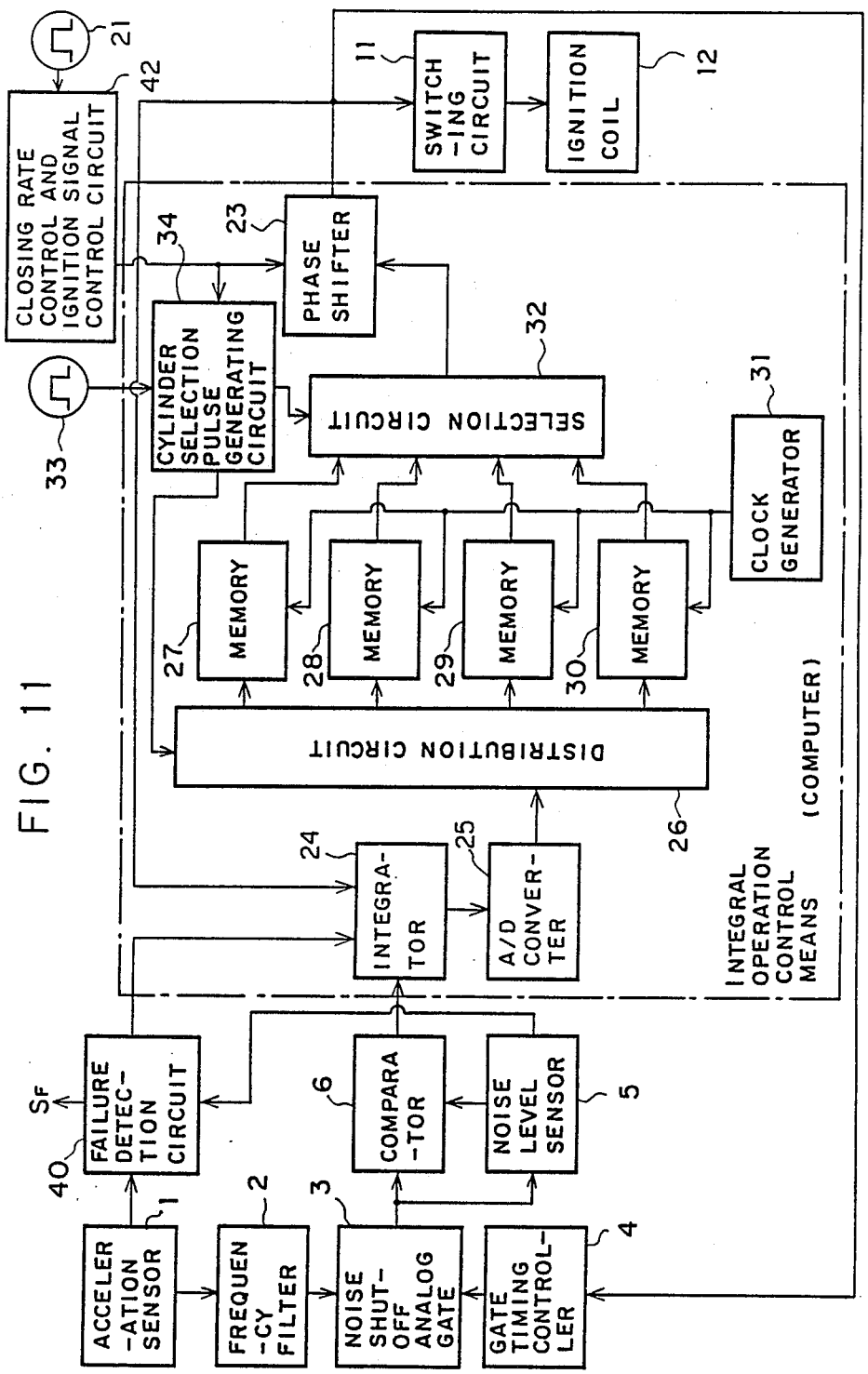

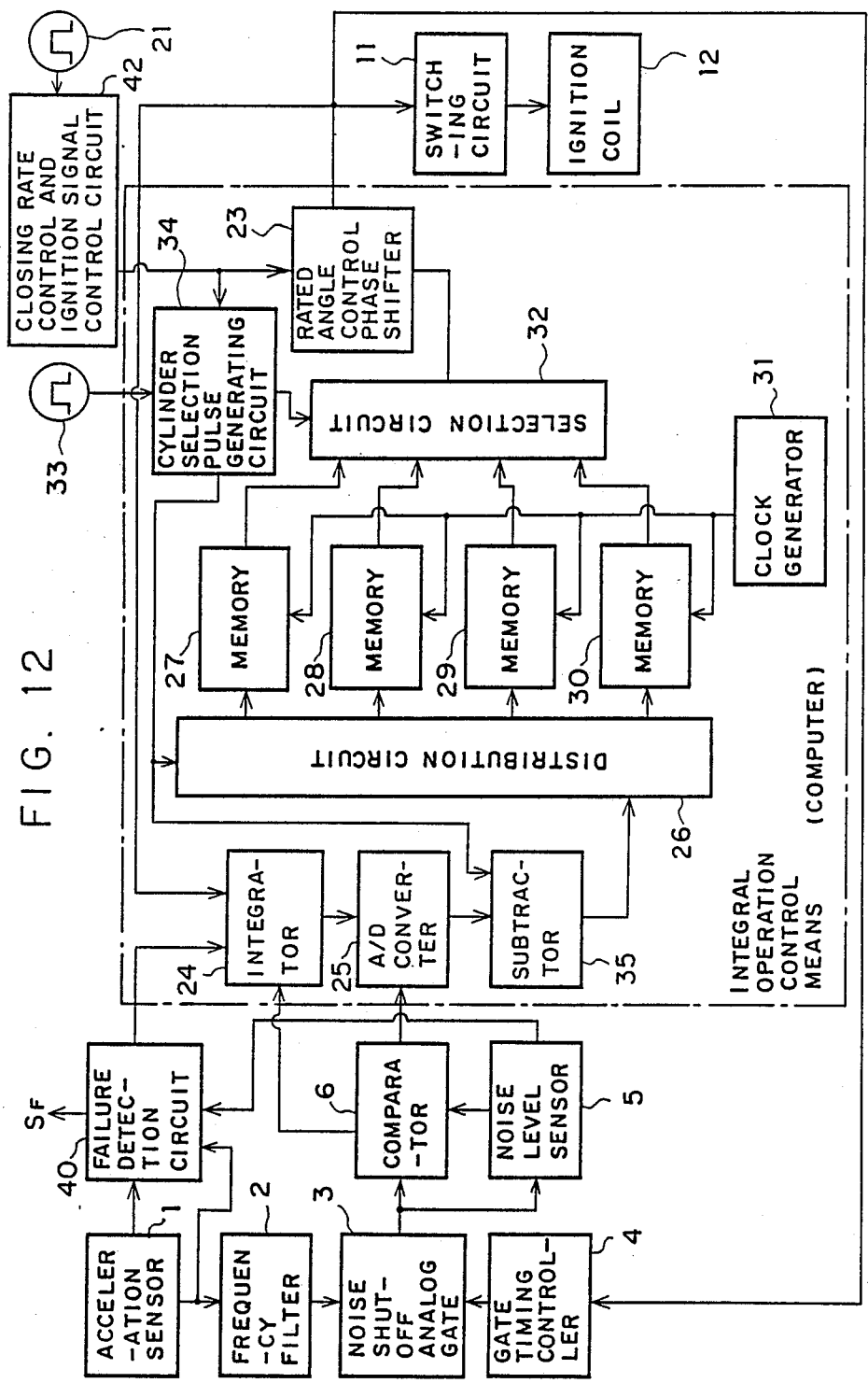

IGNITION TIMING CONTROL DEVICE FOR INTERNAL-COMBUSTION ENGINES

BACKGROUND OF THE INVENTION

1. Field of the Invention

The present invention relates to an ignition timing control device for internal-combustion engines such as gasoline engines and diesel engines and, more particularly, to an ignition timing control device for internal-combustion engines which controls what is called knocking phenomenon caused by abnormal combustion in a combustion chamber of the internal-combustion engine and producing abnormal sound and abnormal vibration in the vicinity of a cylinder block.

2. Description of the Prior Art

Generally, the internal-combustion engine, especially the internal-combustion engine for motor vehicles, produces driving power by reciprocating pistons with combustion pressures created by the ignition by a spark discharged from a spark plug, explosion and burning of an air-fuel mixture drawn into, and compressed in, a cylinder of this engine. Therefore, to obtain a maximum effective motive power it is necessary to control the ignition timing such that aforesaid combustion pressures may constantly be kept at a maximum. To obtain the maximum combustion pressure, the ignition timing must to be controlled to optimize the timing that the spark plug ignites to burn the air-fuel mixture in the combustion chamber.

FIG. 1 shows a conventional ignition timing control device in an internal-combustion engine, in which a numeral 1 designates an acceleration sensor installed in the engine for sensing the vibratory acceleration of the engine; 2 a frequency filter which allows the passage of such high-frequency components of a signal outputted from the acceleration sensor that are sensitive to knocking; 3 an analog gate which shuts off noise of the output signal coming through the frequency filter 2 that acts as a disturbance wave to knock sensing; 4 a gate timing controller which controls the opening and closing of the analog gate 3 correspondingly to the timing of disturbance noise ocurrence; 5 a noise level detector which detects the level of mechanical vibration noise of engine other than the knocking; 6 a comparator which compares the output voltage of the analog gate 3 with that of the noise level detector 5, and produces a knock detection pulse; 7 an integrator which integrates the output pulse of the comparator 6 and produces an integral voltage in accordance with knocking strength; 8 a phase shifter which shifts the phase of a reference ignition signal in accordance with the output voltage of the integrator 7; 9 a rotation signal gnerator which generates an ignition signal in accordance with an ignition-advance characteristic preset on the basis of the rotation of the engine output shaft; 10 a waveform shaping circuit which corrects the waveform of the output of the rotation signal generator 9 and, at the same time, controls the circuit closing angle of an ignition coil 12; and 11 a switching circuit which interrupts the current flow to the ignition coil 12 in accordance with the output signal of the aforementioned phase shifter 8.

FIG. 2 shows the frequency characteristics of the output signal of the acceleration sensor 1. The dotted line A indicates a signal waveform where no knocking takes place, while the full line B shows a signal waveform where the knocking takes place. The output signal of the acceleration sensor 1 includes, besides a knock signal (a signal generated with knocking), a mechanical noise of engine and various noise components coming in a signal transmission path, for example an ignition noise. From a result of a comparison between the dotted line A and the full line B in FIG. 2, it is understood that the knock signal has a peculiar frequency characteristic. Therefore, its distribution definitely differs, in each case, with the presence of knocking although it varies with a difference between engines or with a difference in the mounting position of the acceleration sensor 1. It, therefore, is possible to control the noise of other frequency components by filtering the frequency components of this knock signal, by sensing the knock signal efficiently.

FIGS. 3 and 4 shown the operation waveform of each part of a conventional device; FIG. 3 shows a mode in which no knocking is taking place, while FIG. 4 shows a mode in which the knocking is taking place. Referring to these FIGS. 3 and 4, the operation of the conventional device will be described. As the engine output shaft rotates, an ignition signal produced from the rotation signal generator 9 correspondigly to the preset ignition timing characteristics is shaped to an opening/closing pulse having a desired circuit closing angle by the waveform shaping circuit 10, and the switching circuit 11 is driven through the phase shifter 8 to interrupt the current flow to the ignition coil 12. The engine is ignited to operate by the ignition voltage of the ignition coil 12 that is built up as the flow of current is interrupted. Engine vibration occurring during the operation of this engine is sensed by the acceleration sensor 1.

Where no engine knocking is occurring, there takes place no engine vibration likely to be caused by knocks. However, since there occurs other mechanical vibration, a mechanical noise and an ignition noise affecting the signal transmission path during the ignition timing F will occur with the output signal of the acceleration sensor 1 as shown in FIG. 3 (a).

When this signal passes through the frequency filter 2, most of mechanical noise components are removed as shown in FIG. 3 (b). The ignition noise components, however, being powerful, will in some cases be outputted at a great level even after passing through the frequency filter 2. The ignition noise, if allowed to pass through the filter, will be mistaken as a knock signal; to prevent this, therefore, the analog gate 3 will close for a certain period after the ignition timing on a signal outputted from the gate timing controller 4 shown in FIG. 3(c) which is triggered by the output of the phase shifter 8, thus shutting off the ignition noise. With the output of the analog gate 3, only such a low-level mechanical noie as is shown by the waveform C in FIG. 3(d) will remain.

On the other hand, the noise level sensor 5 operates in response to changes of a peak value of the output signal of the analog gate 3. In this case, the noise level sensor 5 has a characteristic to be able to respond to relatively gentle changes of the peak value of ordinary mechanical noise, producing a direct current (DC) voltage slightly higher than the peak value of the mechanical noise (waveform D in FIG. 3(d)).

Therefore, since the output of the noise level sensor 5 is greater than a mean peak value of an output signal of the analog gate 3 as shown in FIG. 3 (d), the comparator 6 which compares these will not output any noise signal; that is, the noise signal is thoroughly removed.

Therefore, the output voltate of the integrator 7 remains zero as shown in FIG. 3 (f), and accordingly the phase shifting angle (a difference in the input and output phases in FIG. 3(g), (h)) by the phase shifter 8 will also become zero.

Therefore, the opening closing phase of the switching circuit 11 which is driven by this output, that is, the current interruption phase of the ignition coil 12, will become of the same phase as the reference ignition signal of the output of the waveform shaping circuit 10. The ignition timing, therefore, will become the reference ignition timing.

When knocking occurs, a knock signal is included in the output of the acceleration sensor 1 near a point retarded for a certain time from the ignition timing as shown in FIG. 4 (a), and, after passing through the frequency filter 2 and the analog gate 3, will become a mechanical noise largely overlapped by a knock signal as shown at the waveform C in FIG. 4(d).

Of the signal that has passed through this analog gate 3, the knock signal rises sharply; therefore the level of the output voltage of the noise level sensor 5 retards to respond to the knock signal. In consequence, since the input of the comparator 6 becomes as indicated by the waveforms C and D in FIG. 4 (d) respectively, a pulse will occur with the output of the comparator 6 as shown in FIG. 4 (e).

The integrator 7 integrates the pulse, producing an integrated voltage as shown in FIG. 4 (f). Since the phase shifter 8 shifts the output signal (reference ignition signal shown in FIG. (g) of the waveform shaping circuit 10) to the time-delay side in accordance with the output voltage of the integrator 7, the output phase of the phase shifter 8 is delayed behind the phase of the reference ignition signal of the waveform shaping circuit 10, and actuates the switching circuit 11 by a phase shown in FIG. 4 (h). Consequently, the ignition timing is delayed, thus controlling knocking tendencies. As a result, the conditions shown in FIGS. 3 and 4 are repeated to perform the optimum ignition timing control.

Since the conventional device is so constituted as described above, the decreased speed (the speed at which the ignition timing moves toward the reference until it is reset on the spark advance side) of the integrator 7 indicates the characteristic of a unit of a second per degree of rotation angle of the engine output shaft, which is a large time constant. This decreased speed prevents the occurrence of severe knocks by controlling the too fast return of the ignition timing toward the spark advance side and suddenly into the knocking region. This is an important characteristic for ignition timing control.

Therefore, to determine the amount of knocks sensed per knock sensing from the output of this integrator 7, it is necessary to obtain the output of the aforementioned integrator 7 immediately before and immediately after the knock sensing and to determine a difference between values thus obtained, that is, an output variation of the integrator 7 per knock sensing. This requires complicated calculation. Only reading the value indicated on this integrator 7 at the time of knock sensing, however, is not enough to obtain the amount of knocking sensed. Therefore, it is because the output of the integrator 7, for example before the occurrence of knocking, must be memorized and, in the event that the knocking has taken place, a difference between the output of the integrator 7 immediately before the occurrence of knocking and that immediately after the occurrence of knocking must be obtained.

In the meantime, the technological level of engine control has a trend to become more and more enhanced; in a multicylinder engine, engine control is accurately effected for each cylinder to maintain all the cylinders in a much more improved combustion state in order to provide an improved engine output. To insure such control, it is necessary to detect and determine the amount of knocking occurring in each cylinder. However, the conventional device has such a problem that a complicated calculation is needed to determine the amount of knocking occurrence every time the knocking occurs from the output of the integrator 7, and besides a much larger-scale circuit is needed to determine the amount of knocking occurrence for each cylinder from this.

Furthermore, a knock signal produced corresponding to the occurrence of knocking in the engine can not be sensed unless a knock signal and a noise signal in the output of the frequency filter (FIGS. 3 (b) and 4 (b)) can be discriminated by a voltage value. Viewed with respect to the vibration characteristics of an engine, the conventional device has the following problem that a noise signal like a knock signal sometimes occurs in for example an engine that has undergone a durability test; this noise signal in some cases causes the ignition timing control device to make a wrong operation. Namely, during an initial period (when the engine is still new), the control device operates as desired, but with the lapse of operating time, the noise signal grows and is incorrectly sensed, resulting in such troubles as an inefficiently controlled ignition timing, lowered engine output, increased fuel consumption, and an exhaust gas temperature rise.

SUMMARY OF THE INVENTION

A first object of the present invention is to provide an ignition timing control device for internal-combustion engines which is capable of controlling the occurrence of knocking to a minimum by sensing the amount of occurrence of knock which takes place in an engine at each ignition, and by performing only a simple integration by reading and resetting a value of this amount of occurrence of knocking thus sensed.

A second object of the present invention is to provide an ignition timing control device for internal-combustion engines which is capable of easily producing a high engine output by operating all cylinders of the engine efficiently by sensing the amount of knocking occurring in each cylinder in an internal-combustion engine having a plurality of cylinders by a sensing means of simple constitution, not by a large-scale circuit which performs complicated operation by the use of only a conventional integrator.

Furthermore, a third object of the present invention is to provide a high-performance ignition control device for internal-combustion engines which is capable of constantly accurately sensing a difference between a knocking sound of the internal-combustion engine and the other noises, regardless of whether the engine is used for hours, in order to prevent ineffective ignition timing control operation resulting from wrong sensing; thereby insuring an increase in engine output, an improvement in fuel economy, and control of exhaust gas temperatures.

The ignition timing control device for internal-combustion engines of the present invention, which is adapted to accomplish the aforesaid objects, includes a knock sensor which senses knock information on the internal-combustion engine; a knock discriminator which discriminates knocks occurring in each cylinder of the engine and sensed by the knock sensor; an integrator which outputs an integral voltage from the output of the knock discriminator and resets this integral voltage correspondingly to ignition operation; an integrator which integrates the integral voltage; a subtractor, when desired, which subtracts a specific value, for example a value corresponding to an engine noise signal, from the output of the aforesaid knock discriminator; a phase shifter which performs the phase shift control of an ignition signal on the basis of the output of the aforementioned integrator or the output of the aforementioned subtractor when desired and a switching circuit which interrupts the flow of current into the ignition coil correspondingly to the output of the phase shifter.

BRIEF DESCRIPTION OF THE DRAWINGS

FIGS. 6 (a) to (h) are characteristic diagrams showing the output waveforms of each part when no knocking is taking place in the engine in the first embodiment of FIG. 5;

FIGS. 7 (a) to (h) are characteristic diagrams showing the output waveform of each part when knocking is taking place in the same engine;

FIG. 11 is a block diagram showing an example of variation of the first embodiment explained by referring to FIGS. 5 to 10;

FIG. 12 is a block diagramm showing a second embodiment of the ignition timing control device for internal-combustion engines of the present invention;

DETAILED DESCRIPTION OF THE PREFERRED EMBODIMENTS

Preferred embodiments of the ignition timing control device for internal-combustion engines of the present invention will now be described by referring to the accompanying drawings.

Figure 1:
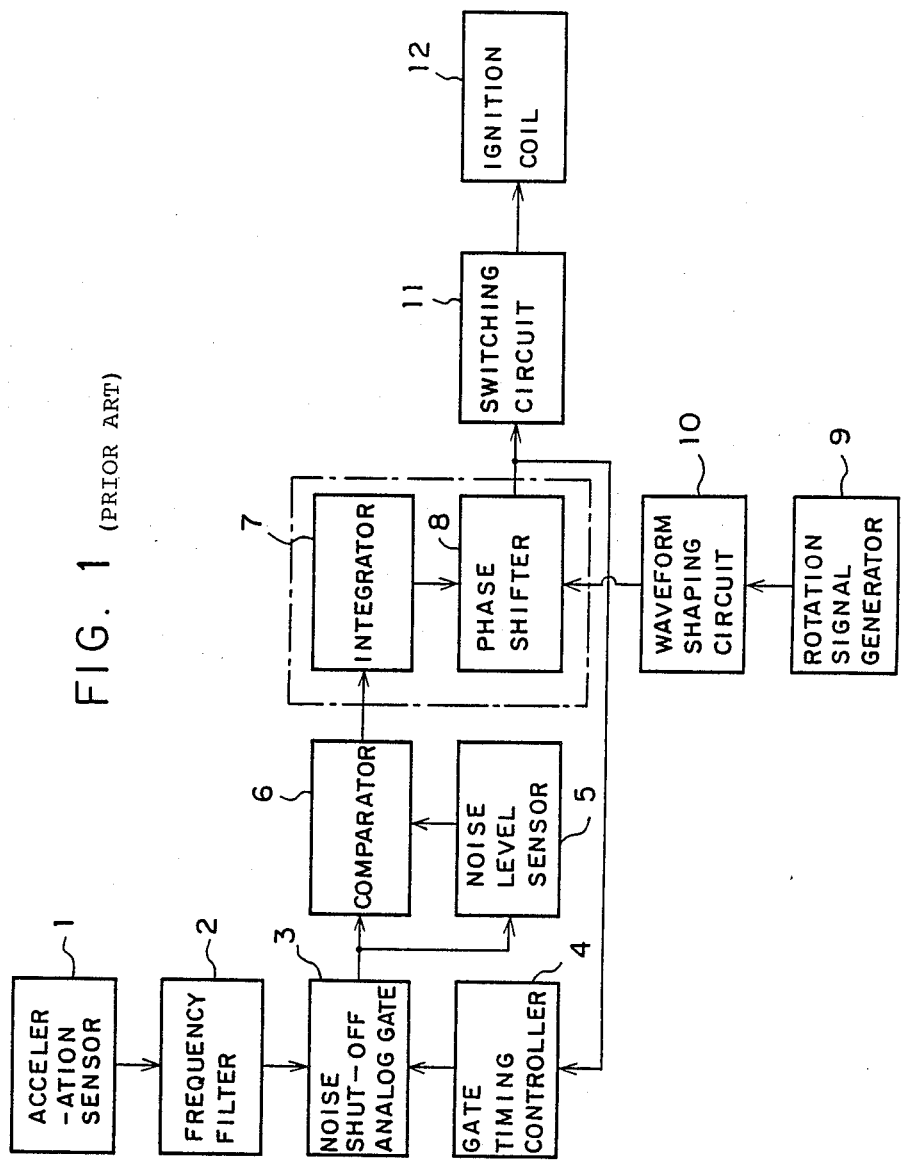
FIG. 1 is a block diagram showing one example of a conventional ignition timing control device for internal-combustion engines.
Figure 5:
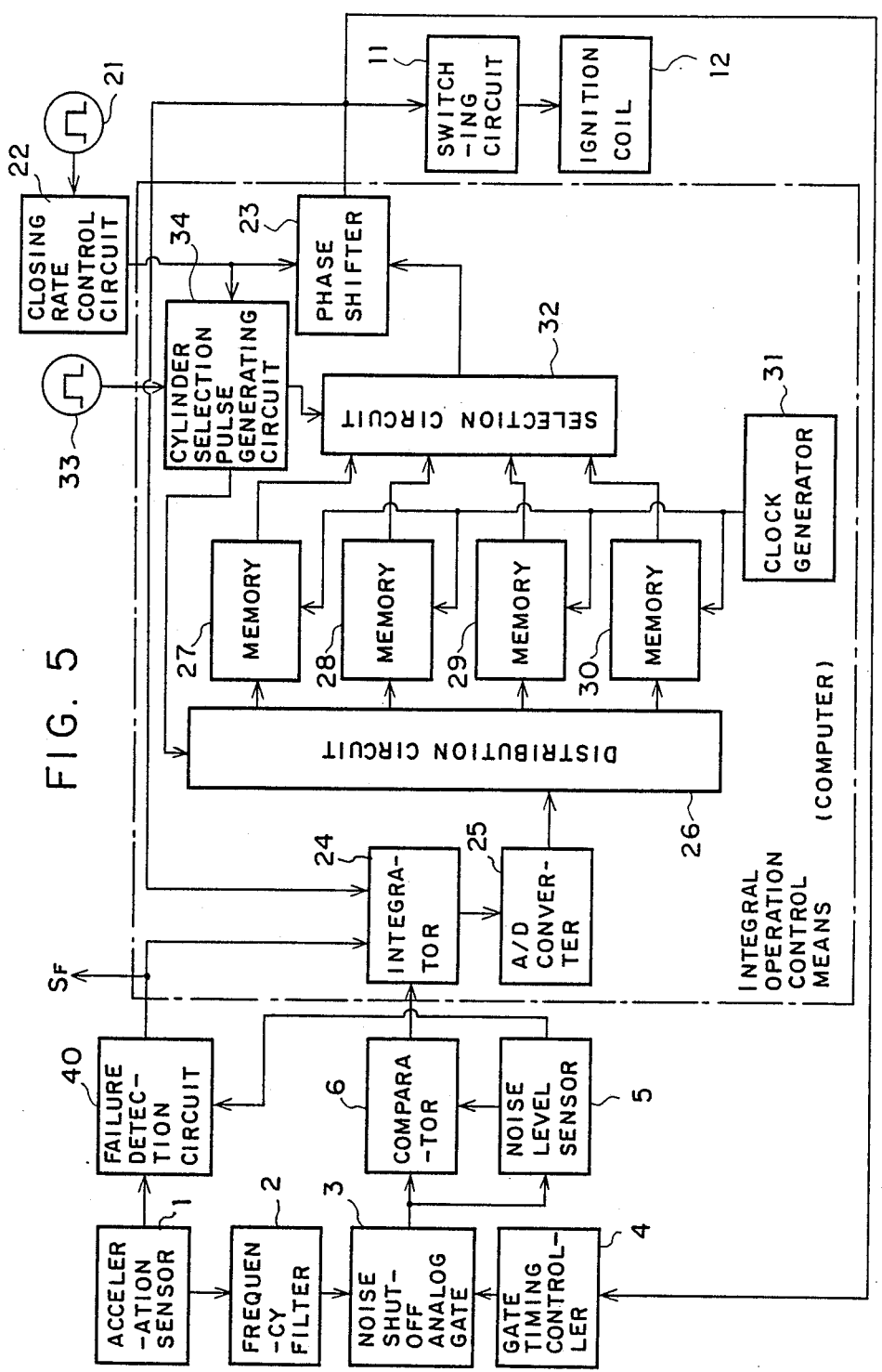
FIG. 5 is a block diagram showing a first embodiment of the ignition timing control device for internal-combustion engines of the present invention.

FIGS. 5 to 10 are block diagrams and characteristic diagrams showing the first embodiment of the present invention. In FIG. 5, numerals 1 to 6 and numerals 11 and 12 designate parts the same as, or equivalent to, parts of FIG. 1 showing a prior-art control device; and therefore the description of each of them is omitted. Numeral 21 is a cylinder pulse generator which produces a cylinder pulse corresponding to the ignition operation of each cylinder of the engine; numeral 22 is a closing rate control circuit which receives the above-mentioned cylinder pulse and outputs an ignition pulse after controlling the closing rate to maintain the time to supply the current to the ignition coil 12; numeral 23 is a phase shifter which controls the aforesaid ignition pulse to retard its angle in accordance with the control voltage and outputs the ignition pulse; and numeral 24 is an integrator which, receiving a knock pulse from the comparator 6, outputs an integral voltage proportional to its time width. This integrator, unlike the integrator 7 for the prior-art device in FIG. 1 described above, has no function to progressively decrease the integral voltage with the lapse of time, but has a function to reset the integral voltage by each ignition for example at the time of ignition on the basis of the ignition pulse outputted from the phase shifter 23. Numeral 25 is an analog-digital converter (hereinafter termed the A/D converter) which converts the integral voltage from the aforementioned integrator 24 into a digital signal and outputs the digital signal; and numeral 26 is a distribution circuit which distributes and outputs the aforesaid digital signal corresponding to a cylinder producing knocks. This embodiment shows the distribution circuit in a four-cylinder engine, and therefore the distribution circuit outputs four digital signals correspondingly to the number of the cylinders. Numerals 27 to 30 designate memories which store the digital signals from the distribution circuit 26 for each cylinder. For example, the memory 27 stores the amount of knocking that occurs in one cylinder. Numeral 31 is a clock generator which inputs a pulse into the memory for the purpose of subtraction of a stored value from each of the aforementioned memories 27 to 30; 32 is a selection circuit which selects and outputs only data from each output of the aforementioned memories 27 to 30, to cylinders in which the mixture is to be ignited; 33 is a reference pulse generator which generates a reference pulse corresponding to the reference cylinder of the four cylinders of the engine; and 34 is a cylinder selection pulse generating circuit which produces cylinder selection pulses in succession from the aforesaid reference pulse and the ignition pulse from the closing rate control circuit 22 such that the distribution circuit 26 and the selection circuit 32 will operate corresponding to specific cylinders; 40 is a failure detection circuit which detects such a failure as the breakage of a signal line between the acceleration sensor 1 and the frequency filter 2 or a short to the ground, and detects abnormal voltage of the output of the noise level detector 5, and then inputs a failure signal to the integrator 24 and at the same time sends the failure signal $S_F$ to other fuel control device, vehicle diagnosis apparatus, etc.

Figure 2:
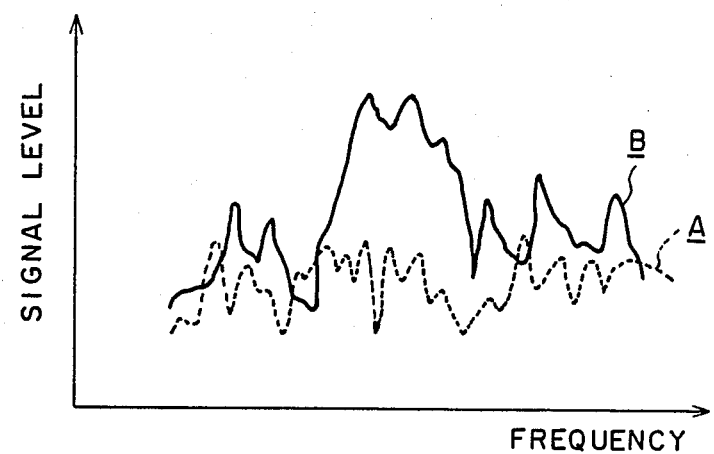
FIG. 2 is a characteristic diagram showing the frequency characteristics of an acceleration sensor in FIG. 1.
Figure 3:
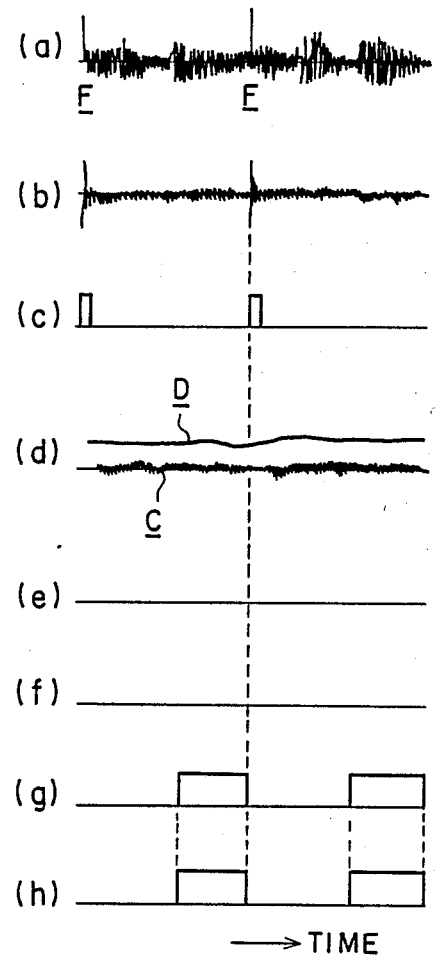
FIGS. 3(a) to (h) are characteristic diagrams showing the output waveform of each part when no knocking is taking place in an internal-combustion engine provided with a conventional control device.
Figure 4:
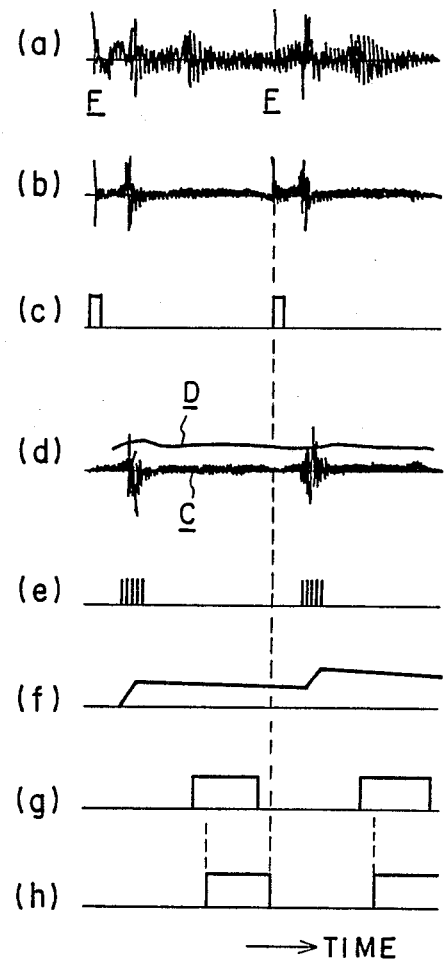
FIGS. 4 (a) to (h) are characteristic diagrams showing the output waveform of each part when knocking is taking place in the internal-combustion engine provided with the conventional control device.

FIGS. 6 and 7 are drawings showing the operation waveforms of each part shown in FIG. 5. Each waveform designated by the same numeral as in FIGS. 2 and 3 showing the operation waveform of each part of the prior-art device described above agrees with each waveform appearing in FIGS. 2 and 3.

First, the basic operation is conducted by referring to FIGS. 6 and 7. When no engine knocking is taking place, two kinds of inputs of the computer 6 will occur as shown in FIG. 6 (d); since no knock signal is present at C of FIG. 6 (d), no pulse is outputted by the comparator 6, as shown in FIG. 6 (e). And accordingly the integrator 24 makes no output (FIG. 6 (f)). Therefore the memories 27 to 30 store no value, and the selection circuit 32 does not output. Accordingly there exists no phase difference between the input FIG. 6 (g)) and output (FIG. (h)) of the phase shifter 23, with the ignition timing remaining in the reference position.

Next, the basic operation to be effected when engine knocking is taking place will be described by referring to FIG. 7. The two kinds of inputs of the comparator 6 will become as shown in FIG. 7 (d) and a knock signal appears at C of FIG. 7 (d); therefore a knock pulse is outputted from the comparator 6 as shown in FIG. 7 (e). This pulse is integratd by the integrators 24. Here, since knock sensing is made for each cylinder, the output of the integrator 24 is reset for each ignition by the output of the phase shifter 23. Therefore, the output of the integrator 24 is kept at a fixed value during a period from the knock sensing to resetting. This operation is for performed every ignition of an ignition cycle. This operation is different from that of prior-art devices. The output (integral voltage) of the integrator 24 is converted to a digital signal by the A/D converter 25. The distribution circuit 26 discriminates a cylinder where knocking occurs, on the basis of the cylinder selection pulse from the cylinder selection pulse generator 34, and inputs a digitalized integral voltage from the A/D converter 25 into the memory 29 corresponding to the cylinder with knocking, for example the third cylinder. The memory 29 stores the integral voltage from the aforementioned distribution circuit 26. The selection circuit 32 selects the memory 29 corresponding to the third cylinder on the basis of the cylinder selection pulse from the cylinder selection pulse generator 34, and outputs its output to the phase shifter 23. Here, since a knocking has occurred in the third cylinder, the output of the memory 29 is selected and inputted into the phase shifter 23 at the time of ignition operation of the third cylinder. In FIG. 7, knocking is also occurring in the next cylinder, and therefore the knocking has taken place in the fourth cylinder when the engine is an ordinary four-cylinder engine. In this case, the output of the integrator 24 is selected by the distribution circuit 26 ad stored in the memory 30. Furthermore, the output is selected by the selection circuit 32 and the output of the memory 30 is entered into the phase shifter 23 at the time of ignition operation of the fourth cylinder.

Figure 8:
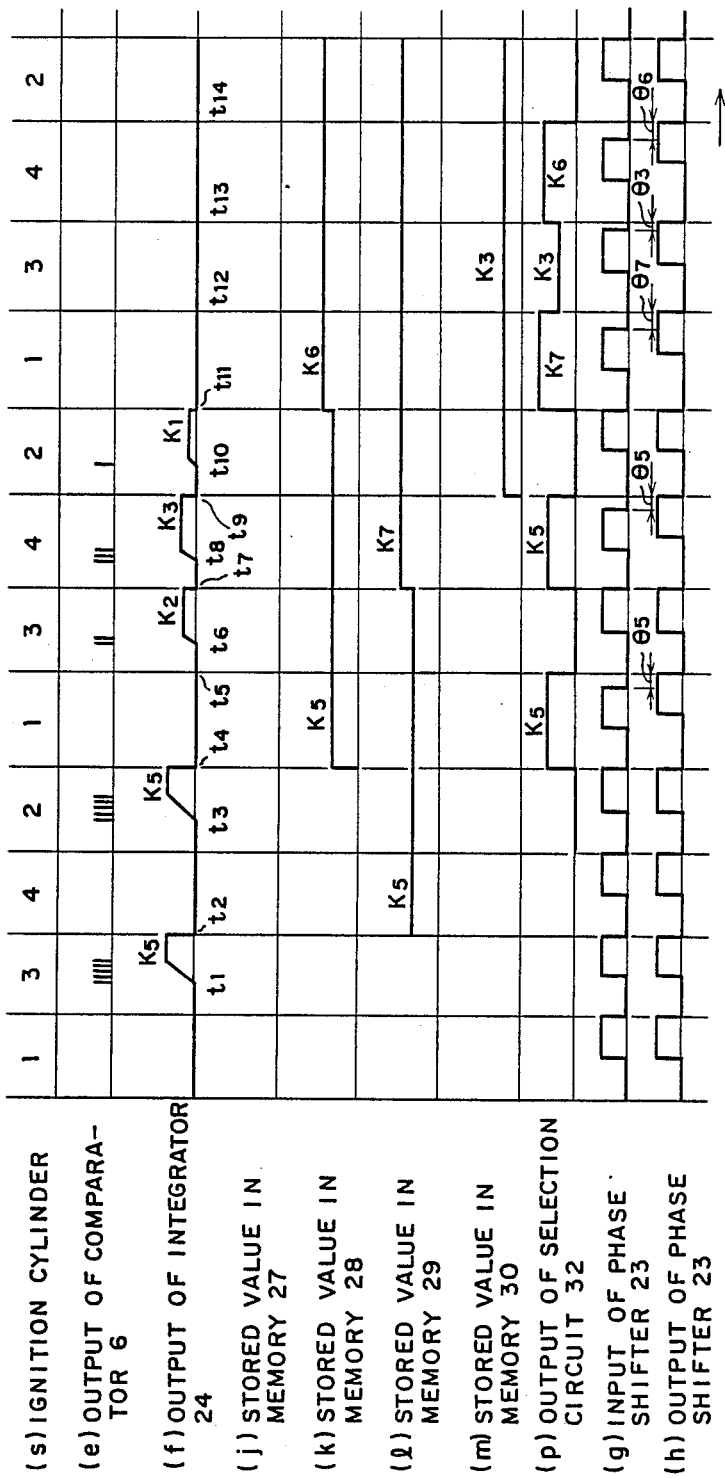
FIG. 8 is an operation waveform diagram for each cylinder of the internal-combustion engine in the first embodiment of FIG. 5.

Next, referring now to the waveforms in FIG. 8, there is described in detail the control of each cylinder. In the drawing, (s) is a letter denoting a cylinder in which ignition takes place; (e) is the output of the comparator 6; (f) is the output of the integrator 24; (j), (k), (l), and (m) are stored values in the memories 27 to 30; (p) is the output of the selection circuit 32; and (g) and (h) are input and output of the phase shifter 23, respectively.

A knock pulse is now appearing in the output of the comparator 6, with knocking occuring in the third cylinder, second cylinder, third cylinder, fourth cylinder, and second cylinder in order as shown in FIG. 8 (e). The known pulse is converted to an integral voltage by the integrator 24, its output becoming as shown in FIG. 8 (f). Here, K1, K2, K3, and K5 denote the knock levels of sensing. The knock levels K1, K2 K3 and K5 are arranged in order to increasing knock level. The knock level K5 expresses a maximum knocking. Knocking occurs in the third cylinder at the time t1, and the integrator 24 outputs the voltage based on the knock level K5. This voltage K5 is converted into a digital signal by the A/D converter 25, being inputted into the distribution circuit 26. The distribution circuit 26 selectively outputs the aforementioned digitalized integral voltage K5 to the memory 29 at the ignition time t2, and the intgral voltage K5, therefore, will be stored in the memory 29. Thus the value stored in the memory 29 will become a voltage K5 (FIG. 8 (1)). Subsequently, at the time t3, knocking occurs in the second cylinder and is converted into the integral voltage K5 by the integrator 24. This voltage K5 is converted into a digital signal by the A/D converter 25, inputted selectively into the memory 28 by the distribution circuit 26, and then stored in the memory 28 at the time t4 (FIG. 8 (k)). The timer t4 is the ignition time of the first cylinder, and thereafter the ignition operation of the third cylinder will begin. At this time, because the voltage K5 is stored in the memory 29, the aforesaid voltage K5 will be outputted from the selection circuit 32 (FIG. 8 (p)), being inputted to the phase shifter 23. At the phase shifter 23, therefore, the next ignition timing will be retarded by an angle $\theta 5$ (a phase delay of output (FIG. 8 (h)) from the input (FIG. 8 (g)) of the phase shifter 23) in relation to the aforesaid voltage K5, thus performing ignition at the time t5. Despite the ignition at the time t5 retarded by the angle $\theta 5$ from the reference ignition timing, knocking is occurring in the third cylinder again at the time t6. This level is K2, and the integral voltage K2 corresponding thereto will be inputted into the memory 29 at the ignition timing (time t7) of the fourth cylinder located next. Since, at this time, the voltage K5 has already been stored in the memory 29, the aforementioned voltage K2 will be added thereto and the voltage K7 will be newly stored (FIG. 8 (l)). When ignition takes place at the time t7 (reference ignition timing), knocking occurs at the time t8 in the fourth cylinder, the integral voltage K3 being outputted. This voltage K3 will be stored in the memroy 30 at the ignition timing (time t9) of the second cylinder located next.

In the meantime, the ignition operation of the second cylinder located next is performed; at this time, because the voltage K5 is stored in the memory 28, the above-mentioned voltage K5 will selectively be inputted into the phase shifter 23 from the selection circuit 32. Thus, the following ignition timing will be the time t9 retarded from the reference by the angle $\theta 5$ corresponding to the voltage K5 described above. With ignition at this time t9, knocking will occur in the second cylinder at the time t10, and the integral voltage K1 will be outputted. This voltage K1 will be added to the memory 28 at the time t1 of the next ignition timing, and the value stored in the memory 28 will become the voltage K6. At the time t12 the ignition operation of the third cylinder will start. At this time since the voltage K7 is stored in the memory 29, the following ignition timing t12 is retarded by the angle θ7 from the reference. Hereafter the retard angle control is similarly repeated, retarding the ignition timing (time t13) of the following fourth cylinder by the angle 03 from the reference. Accordingly the ignition timing (time t14) of the following second cylinder will retard by the angle 06 from the reference.

As described above, the ignition timing is retarded according to the amount of knocking sensed (integral voltage); when the engine knocking has ceased, the ignition timing must be advanced at a specific speed toward the reference, close to the limit of knocking. Here, stored values in the memories 27 to 30 are subtracted at a specific rate on the basis of clock from a clock generator 31; that is, each stored value is made smaller to decrease the voltage to be inputted into the phase shifted 23, and also to decrease the retard angle, close to the reference.

In the first embodiment described above, the phase shifter 23, the integrator 24 to the selection circuit 32 and the cylinder selection pulse generator circuit 34 can easily be improved to a high-grade system capable of fine control including engine fuel control if constituted by the use of a computer.

Furthermore, it is possible to control a retard angle of all cylinders uniformly by the same degree(s) as in the prior-art device shown in FIG. 1. In this case, the control can be made by using only one of the memories 27 to 30 with the distrtibution circuit 26 for cylinder selection and the selection circuit 32 fixed, and also by switching between the control of each cylinder and the control of all cylinders described above.

Figure 9:
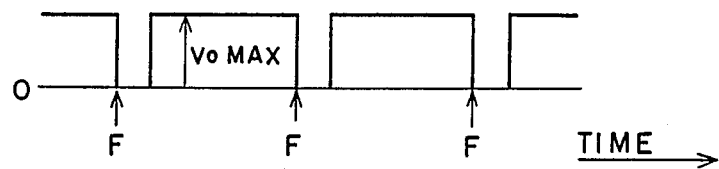
FIG. 9 is a waveform diagram showing an integral voltage to be reset every ignition timing by the output of the phase shifter in case of an engine failure.
Figure 10:
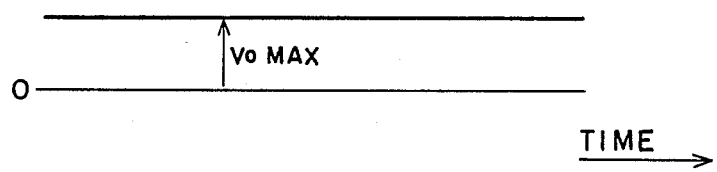
FIG. 10 is a waveform diagram showing an internal voltage of the integrator to be not reset by the output of the phase shifter in case of the same engine failure.

The failure detection circuit 40 outputs a failure signal $S_F$ in the event that the output of the acceleration sensor 1 is not normally inputted into the frequency filter 2 because of the breakage of a signal line connecting between the accleration sensor 1 and the frequency filter 2, a short to ground, etc. Generally, the breakage of the signal line is most likely to occur (for example, defective contact at the connector). Also, in the event of a defective operating condition of the noise level sensor 5, the failure signal $S_F$ will be outputted. Namely, the failure detection circuit outputs a failure signal $S_F$ by detecting the failure of noise level sensor to normally output a comparative reference voltage because the acceleration sensor 1 and the frequency filter 2 have come off their normal set conditions for one cause or another notwithstanding the signal line therebetween being in a normal state, and for example the volume of signals to be processed has increased in excess. When inputted with the aforementioned failure signal $S_F$ from the failure detection circuit 40, the integrator 24 operates independently of the signal from the comparator 6, outputting an integral voltage for failure. FIGS. 9 and 10 show one example of the integral voltage for failure described above. The example in FIG. 9 shows the output of the maximum integral voltage Vo MAX that the integrator 24 can basically constantly output. The integrator 24, however, is reset at the ignition timing (the time of the symbol F) by an ignition signal outputted from the phase shifter 23, being repetitively set to zero at each ignition. FIG. 10 shows the integrator 24 which will not be reset by the ignition signal outputted from the aforesaid phase shifter 23; this can be effected by making the aforesaid ignition signal inputted into the integrator 24 ineffective by the failure signal $S_F$ from the failure detection circuit 40 described above. The voltage Vo MAX is stored in all of the aforesaid memories 27 to 30 so long as the integral voltage Vo MAX is constantly outputted, thus setting to a desired ignition timing for failure at which no knocking will occur. The control is performed here at the maximum value Vo MAX of the output of the integrator 24 in case of a failure, but may be performed at intermediate values other than this maximum value; that is, it is possible to determine the ignition timing with engine knocking characteristics and other characteristics taken into consideration. Furthermore, it is possible to perform engine control overall by inputting the aforesaid failure signal $S_F$ into the fuel control device, and also to develop to a more comprehensive control including the control of occurrence of alarm and others by inputting into a diagnosis apparatus.

FIG. 11 shows an example of a variation of the first embodiment described above. Since, in this drawing, numerals 1 to 6, 11, 12, 21, 23 and 34, and 40 show the same or equivalent parts as component parts of the first embodiment in FIG. 5, their explanation is omitted to avoid duplication. In FIG. 11, there is provided a closing rate control and ignition signal control circuit 42, in place of the closing rate control circuit 22 in the first embodiment previously stated, for outputting an ignition pulse controlled by circuit closing rate control to secure a time to supply the current to the ignition coil in accordance with a pulse outputted for each cylinder from the cylinder pulse generator 21 of the first embodiment described above, and also controlled by ignition timing control for controlling the ignition voltage generating timing. The output to be supplied to the aforesaid cylinder selection pulse generating circuit 34 is directly supplied to the aforesaid pulse generating circuit 34 without passing through the aforesaid closing rate control and the ignition signal control circuit 42.

Figure 16:
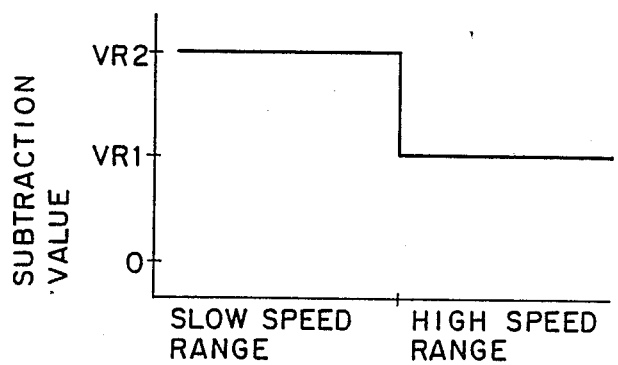
FIG. 16 is a characteristic diagram showing a relationship between the rotation range and the subtraction value of the internal-combustion engine in the second embodiment.

Next, the second embodiment of the present invention will be described in detail by referring to FIGS. 12 and 16.

Figure 13:
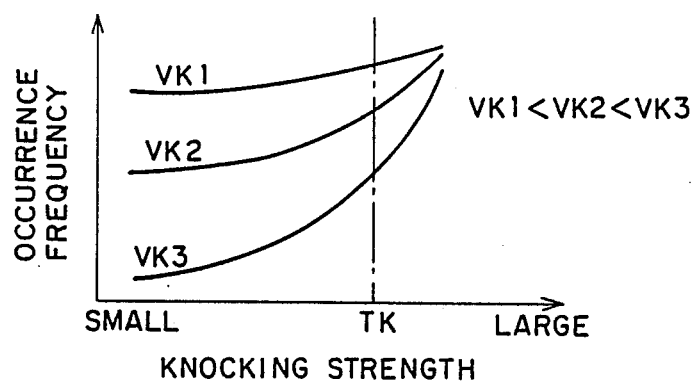
FIG. 13 is a characteristic diagram showing the strength and occurrence frequency of knocks in the internal-combustion engine in the second embodiment of FIG. 12.
Figure 14:
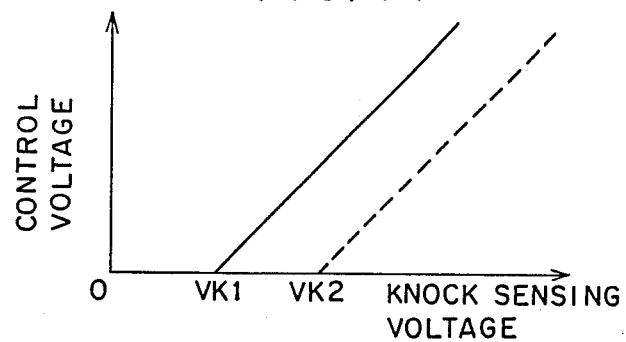
FIG. 14 is a characteristic diagram showing a relationship between a knock sensing voltage and a control voltage in the second embodiment.

First, engine characteristics with a noise signal being sensed will be described. In FIG. 13, the horizontal axis shows knocking strength, while the vertical axis indicates the knocking occurrence frequency per time for example of a knocking sensing signal including noise. VK1 to VK3 indicate the peak voltage of a sensing signal; their relation is VK1<VK2<VK3. The occurrence frequency of each peak voltage VK1 to VK3 described above increases with the increase of strength of knocks occurring in the engine. In this case, the greater the peak voltage, the greater the rate of its increase. Since the matching of controllability is done such that, when engine knocks are taking place, the ignition timing is stabilized by the knocking strength of TK in FIG. 13, and accordingly there will never occur knocking more severe than TK. Here, the occurrence frequency of the voltage VK1 hardly depends on the knocking strength and varies little. The occurrence frequency of VK2 shows a larger variation than VK1 but a smaller variation than VK3. The occurrence frequency of VK3 has the strongest relation with the knocking strength and varies most. Therefore, the control voltage corresponds to the knocking strength only at VK3 and VK2; by finding a sensing voltage exceeding VK1 (VK1 is disregarded as an offset), an effective control voltage corresponding to the knocking strength can be obtained, thereby enabling proper control. In other words, since VK1 is a signal obtained by wrong detection of a noise signal, a smaller sensing signal than this should be disregarded as ineffective and should not be reflected to control. The relationship between this knocking sensing voltage and the control voltage is shown in FIG. 14. The horizontal axis indicates the knocking sensing voltage, while the vertical axis gives the control voltage. In this drawing, the full line indicates the characteristics than when the sensing voltage is less than VK1, the control voltage is zero, and when the sensing voltage has exceeded VK1, a control voltage for the exceeding part of the sensing voltage can be obtained.

FIG. 12 shows the constitution of the ignition timing control device of the second embodiment of the present invention, in which numeral 35 designates a subtracter which receives a knock sensing voltage (output of the integrator 24) converted to a digitalized signal by the A/D converter 24 and outputs after subtracting only the voltage VK1. Other constitution is identical to the constitution of the first embodiment and an example of its variation in FIG. 11.

In the above-mentioned constitution, the integral voltage from the integrator 24 is converted to a digitalized signal by the A/D converter 25, subtracted only by the aforementioned VK1 by the subractor 35, and inputted into the distribution circuit 26. The control voltage to be stored in the momories 27 to 30, therefore, will become of the characteristics shown in FIG. 14, accordingly becoming a small value with VK1 subtracted from the knock sensing voltage (the integral voltage of the integrator 24). In consequence, the sensing voltage by the noise signal is eliminated and only the effective sensing voltage obtained by detecting the knocking signal will be reflected.

Figure 15:
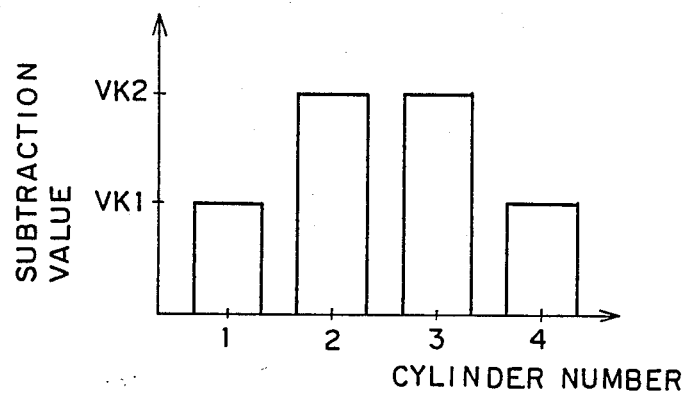
FIG. 15 is a characteristic diagram showing a subtraction value of each cylinder according to the second embodiment.

When the sensing voltage produced by the noise signal has no difference between cylinders, what is required to do is to uniformly subtract only the voltage VK1 from the sensing voltage inputted from the subtractor 35 as described above. However, if a difference in the sensing voltage produced by a noise signal exists between the cylinders, it is necessary to subtract as much voltage as is required by each cylinder. For this purpose, the cylinder selection pulse from the cylinder selection pulse generating circuit 34 is entered into the subtractor 35, which in turn changes the subtraction value of the sensing voltage to VK1 or other value (e.g., VK2) correspondingly to the cylinders. One example of subtraction values for each cylinder is shown in FIG. 15. That is, the subtraction value for the first and fourth cylinders is VK1, and the subtraction value for the second and third cylinders is VK2.

In knocking control, there is a tendency of matching to allow rather severe knocking because a torque is regarded as much more important than driving feeling in the slow-speed range of the engine, and to allow only weak knocking to protect the engine in the high-speed range. In this case, the subtraction value at the subtractor 35 is changed according to the number of revolutions of the engine. One example thereof is shown in FIG. 16. The subtraction value is set at VR2 in the slow-speed range, and to VR1 in the high-speed range. In this case, the relation between the knock sensing voltage (the output voltage of the integrator 24) and the control voltage will become of the characteristics indicated by a broken line in FIG. 14 within the slow-speed range and of the characteristics indicated by a full line in FIG. 14 within the high-speed range. The change of the subtraction value for each cylinder shown in FIG. 15 and the change of the subtraction value for the speed range shown in FIG. 16 may be adopted together, and can be selected on the basis of engine characteristics.

According to the above description, a change between the cylinder-wise control and the speed range-wise control was effected by changing subtraction values at the subracter 35. However, the sensing level can be set by each cylinder by providing the same number of noise level sensors 5 as the number of the cylinders and setting each of the sensors to the characteristics of each cylinder; therefore the sensing of noise level corresponding to a large magnitude of signals exceeding specific values can directly be performed. Also, the sensing of noise levels corresponding to a large magnitude of signals exceeding the specific values can be effected for each number of revolutions by changing the characteristics of the noise level sensors 5 in accordance with the number of revolutions of the engine, thus obtaining an effect similar to that of the embodiments described above. Also the circuit closing rate control and ignition signal control circuit 42, the phase shifter 23, the A/D converter 25, the distribution circuit 26, the memories 27 to 30, the clock generator 31, the selection circuit 32, the cylinder selection pulse generating circuit 34, and the subtracter 35 can be constituted by the use of computers; in this case, fine control of a fuel system and others will become possible.

As described in detail hereinabove, the following various effects can be obtained by the use of the ignition timing control circuit for internal-combustion engines of the present invention.

In an ignition timing control device for engines which is adapted to sense knocking occurring in the engine from the output of a knocking sensor, for example an acceleration sensor, and to control the ignition timing of the engine in accordance with the amount of the knocking sensed, thereby controlling the occurrence of engine knocking to insure efficient engine operation at a knocking limit, the amount of knocking sensed at every ignition is read in and reset so that the amount of knocking occurring in each cylinder can easily be sensed in proportion to the amount of occurrence of knocking, thus obtaining such excellent effects that all of the engine cylinders can efficiently be operated and that the engine output power can be increased to a very high level.

Furthermore, in the ignition timing control device for internal-combustion engines of the present invention which restrains knocking by controlling the retard angle of ignition timing by sensing a knocking information of the engine from a knocking sensor and detecting knocking from the output of this knocking sensor, the ignition timing is controlled corresponding to voltage after the subtraction of a sensed part of knocking by noise from a knocking sensing voltage, and the sensed part of the output of the knocking sensor is eliminated, thereby enabling control by the part of knocking signal and maintenance of controllability during matching, and preventing the decrease of engine output power, worsening of fuel economy, and rise of exhaust gas temperatures.

What is claimed is:

1. An ignition timing control device for internal-combustion engines comprising a knocking sensor which senses knocking information which is abnormal sound or abnormal vibration resulting from abnormal combustion in each cylinder of a internal-combustion engine, a knocking discriminator which discriminates said knocking information; an operation control device which calculates the amount of occurrence of knocking on the basis of an output of said discriminator, calculates an instruction output corresponding to ignition operation, and controls the phase of an ignition signal to a desired angle on the basis of a result of these calculations; and a switching circuit which closes and opens an ignition coil in accordance with this phase output; said operation control device, comprising:

an integral operation control means which outputs integral voltage on the basis of the output of said knocking discriminator, resets this integral corresponding to said ignition operation, calculates the amount of occurrence of knocking in each of said cylinders on the basis of this reset integral voltage, and when said amount of occurrence of knocking in the whole body of said engine has reached a specific value, sends out the phase shift output of said ignition signal to said switching circuit.

2. An ignition timing control device for internal-combustion engines as claimed in claim 1, wherein said integral operation control means comprises an integrator which receives a knocking/noise comparing output from a comparator as said knocking discriminator, a failure detection circuit output, and a retard angle control output at an angle corresponding to a control voltage in relation to the ignition pulse of each cylinder, and then sends out an integral output; an analog-digital converter (hereinafter termed the A/D converter) for the analog-digital conversion of the output of said integrator; a cylinder selection pulse generating circuit which produces a cylinder selection pulse on the basis of a pulse corresponding to the ignition operation of each cylinder and a reference pulse; a distribution circuit which distributively outputs said A/D-converted digital signal to each cylinder where knocking is taking place, on the basis of the output of said A/D converter and the output of said cylinder selection pulse generating circuit; memories for storing, for each cylinder, the amount of occurrence of knocking outputted for each cylinder from said distribution circuit; a selection circuit which selects the amount of occurrence of knocking stored in said memories in accordance with the output of said cylinder selection pulse generating circuit, on the basis of the output of a clock generator which produces pulses at fixed intervals; and a retard angle control phase shifter which retards the reset integral voltage of a cylinder selected by this selection circuit, by an electrical angle corresponding to a pulse for supplying the current to the ignition coil.

3. An ignition timing control device for internal-combustion engines as claimed in claim 1, wherein said integral operation control means comprises an integrator which receives a knocking noise comparative output from said comparator as said knocking discriminator, a failure detection circuit output, and a retard angle control output at an angle corresponding to a control voltage in relation to the ignition pulse of each cylinder, and sends out an integral output an analog-digital converter (hereinafter termed the A/D converter) for the analog-digital conversion of output of this integrator; a distribution circuit which distributively outputs said A/D-converted digital signal to each cylinder where knocking is taking place, on the basis of the output of said A/D converter and the output of said cylinder selection pulse generating circuit; memories for storing, for each cylinder, the amount of occurrence of knocking, as a control voltage, outputted for each cylinder from said distribution circuit; and a selection circuit which selects the amount of occurrence of knocking stored in said memories in accordance with the output of said cylinder selection pulse generating circuit, on the basis of the output of said clock generator which produces pulses at fixed intervals; said phase shifter, said integrator, said A/D converter, said distribution circuit, said memories, said clock generator, said selection circuit, and said cylinder selection pulse generating circuit being constituted by a computer.

4. An ignition timing control device for internal-combustion engines comprising a knocking sensor which senses knocking information which is abnormal sound and abnormal vibration resulting from abnormal combustion in each cylinder of the internal-combustion engine; a knocking discriminator which distriminates said knocking information; an operation control device which calculates the amount of occurrence of knocking on the basis of output of said discriminator, calculates an instruction output corresponding to ignition operation, and controls the phase of an ignition signal to a desired angle on the basis of a result of these calculations; and a switching circuit which closes and opens an ignition coil in accordance with this phase output; said operation control device, comprising:

an integral subtraction operation control means which outputs an integral voltage on the basis of the output of said knock discriminator, subtracts, for each cylinder, a voltage value equivalent to the amount of noise in each cylinder after uniformly subtracting this integral voltage by an incorrectly sensed part of the noise signal, calculates the amount of occurrence of knocking for each of said cylinders on the basis of the voltage value thus subtracted, and when said amount of occurrence of knocking in the whole body of said engine has reached a specific value, sends out the phase shift output of said ignition signal to said switching circuit.

5. An ignition timing control device for internal-combustion engines as claimed in claim 4, wherein said integral subtraction operation control means comprises an integrator which receives a knocking/noise comparative output from a comparator as said knocking discriminator, a failure detection circuit output, and a retard angle control output at an angle corresponding to a control voltage in relation to the ignition pulse of each cylinder, and then sends out an integral output; an A/D converter for the A/D conversion of the output of this integrator; a cylinder selection pulse generating circuit which produces a cylinder selection pulse on the basis of a pulse corresponding to the ignition operation of said engine and a reference pulse; a subtractor which uniformly eliminates the sensing voltage caused by a noise signal by subtracting said integral voltage for an incorrectly sensed part of the noise signal when there is no difference in the sensing voltage between said cylinders and subtracts for each cylinder when there is a difference between cylinders in the sensing voltage caused by the noise signal, on the basis of the output of said A/D converter and the output of said cylinder selection pulse generating circuit; a distribution circuit which distributes the output of said subtractor in accordance with the output of said cylinder selection pulse generating circuit to each cylinder where knocking is occurring; memories for storing, for each cylinder, the amount of occurrence of knocking, as the control voltage, outputted for each cylinder by said distribution circuit; a selection circuit which selects the amount of occurrence of knocking of each cylinder which is stored in said memories, in accordance with the output of said cylinder selection pulse generating circuit; and a retard angle control phase shifter which outputs the control voltage stored in said memory selected by this selection circuit, at an angle retarded for the electrical angle corresponding to a pulse for supplying the current to the ignition coil.

6. An ignition timing control device for internal-combustion engines as claimed in claim 4, wherein said integral subtraction operation control means comprises an integrator which receives a knocking/noise comparative output from said comparator as a knocking discriminator, a failure detection circuit output, and said phase shifter output, and outputs said integral voltage; said A/D converter for A/D conversion of said integrator output; a cylinder selection pulse generating circuit which produces a cylinder selection pulse for selecting an arbitrary cylinder on the basis of a pulse corresponding to the ignition operation of said engine and a reference pulse; a subtractor which subtracts an incorrectly sensed part of a noise signal from said integral voltage and subtracts for each cylinder a noise signal sensing voltage difference between cylinders, on the basis of the output of said A/D converter and the output of said cylinder selection pulse generating circuit; a distribution circuit which distributes to each cylinder the output of said subtractor in accordance with the output of said cylinder selection pulse generating circuit memories for storing, for each cylinder, the amount of occurrence of knocking outputted for each cylinder by this distribution circuit as the control voltage; a selection circuit which selects said memory storage control voltage in accordance with said cylinder selection pulse generating output on the basis of the output of a clock generator which produces pulses at fixed intervals; and a retard angle control phase shifter which outputs said control voltage selected by this selection circuit, at an angle retarded by an electrical angle corresponding to a pulse for supplying the current to the ignition coil; said integrator, said A/D converter, said cylinder selection pulse generating circuit, said distribution circuit, said memories, said clock generator, said selection circuit, and said retard angle control phase shifter being constituted by a computer.

* * * * *

UNITED STATES PATENT AND TRADEMARK OFFICE
CERTIFICATE OF CORRECTION

PATENT NO. : 4,788,957

DATED : December 6, 1988

INVENTOR(S) : Satosi Komurasaki

It is certified that error appears in the above-identified patent and that said Letters Patent is hereby corrected as shown below:

```
Column 1, line 28, delete the word "to" (first occurrence);
          line 37, after "sensor" insert --1--;
          line 43, "ocurrence" should be --occurrence--;
          line 53, "gnerator" should be --generator--;
          line 68, "the" should be --this--.
Column 2, line 15, "shown" should be --show--;
          line 22, "correspondigly" should be --correspondingly--;
          line 54, "noie" should be --noise--.
Column 4, lines 32-33, "inefficiently" should be --ineffectively--.
Column 5, line 53, "internal" should be --integral--;
          line 59, "diagramm" should be --diagram--.
Column 6, lines 39-40, "analog-digital" should be --analog/digital--.
Column 7, line 9, "waveforms" should be --waveform--;
          line 16, "computer" should be --comparator--;
          line 32, "integratd" should be --integrated--;
          same line, "integrators" should be --integrator--;
          line 38, delete the word "for";
          same line, after "performed" insert --for--;
          line 62, "ad" should be --and--.
Column 8, line 14, after "K2" insert --,--;
          line 15, "to" should be --of--;
          line 24, "intgral" should be --integral--;
          line 33, "timer" should be --time--;
          line 56, "memroy" should be --memory--.
Column 9, line 1, "tl" should be --tll--;
          line 9, "03" should be --θ3--;
          line 11, "06" should be --θ6--;
          line 22, "shifted" should be --shifter--;
          line 34, "distrtibution" should be --distribution--;
          line 49, after "of" insert --the--.
Column 10, line 23, "and" (first occurrence) should be --to--.
```

UNITED STATES PATENT AND TRADEMARK OFFICE
CERTIFICATE OF CORRECTION

PATENT NO. : 4,788,957

DATED : December 6, 1988

INVENTOR(S) : Satosi Komurasaki

It is certified that error appears in the above-identified patent and that said Letters Patent is hereby corrected as shown below:

```
Column 11, line 11, "than" should be --that--;
           line 21, "24" should be --25--;
           line 28, "subractor" should be --subtracter--.
           line 30, "momories" should be --memories--;
           lines 41-42, "subtractor" should be --subtracter--;
           line 48, "subtractor" should be --subtracter--;
           lines 60-61, "subtractor" should be --subtracter--;
Column 13, line 15, after "integral" insert --voltage--.
Column 14, line 19, "distriminates" should be --discriminates--.
Column 16, line 8, after "circuit" insert --;--.
```

Signed and Sealed this

Twenty-first Day of November, 1989

*Attest:*

JEFFREY M. SAMUELS

*Attesting Officer*   *Acting Commissioner of Patents and Trademarks*